United States Patent
Montgomery et al.

(10) Patent No.: US 6,226,359 B1
(45) Date of Patent: May 1, 2001

(54) VOICE MAIL SOURCE ADDRESS INDENTIFICATION BLOCKING

(75) Inventors: Robert H. Montgomery, Oak Hill; Michael G. Pilkerton, Fairfax; Robert D. Farris, Sterling, all of VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/073,812

(22) Filed: May 7, 1998

(51) Int. Cl.[7] .............................. H04M 1/64; H04M 7/00
(52) U.S. Cl. ................. 379/67.1; 379/88.17; 379/88.18; 379/220; 379/230
(58) Field of Search ................................ 379/67.1, 88.13, 379/88.26, 88.21, 93.03, 93.12, 93.23, 127, 142, 201, 243, 88.17, 88.11, 88.12, 88.14, 88.23, 88.25, 93.13, 93.14, 196, 220, 230; 705/1, 26; 709/217, 227; 345/327; 348/7, 10, 12, 13

(56) References Cited

U.S. PATENT DOCUMENTS

| | | | |
|---|---|---|---|
| 4,652,700 | 3/1987 | Matthews et al. | 379/88.26 |
| 4,847,890 | * 7/1989 | Solomon et al. | 379/88.21 |
| 5,008,926 | 4/1991 | Misholi | 379/88.13 |
| 5,012,511 | 4/1991 | Hanle et al. | 379/211 |
| 5,193,110 | 3/1993 | Jones et al. | 379/93.14 |
| 5,497,414 | * 3/1996 | Bartholomew | 379/142 |
| 5,680,442 | * 10/1997 | Bartholomew et al. | 379/67.1 |
| 5,835,087 | * 11/1998 | Herz et al. | 345/327 |
| 5,884,270 | * 3/1999 | Walker et al. | 705/1 |
| 5,884,272 | * 3/1999 | Walker et al. | 705/1 |

* cited by examiner

Primary Examiner—Fan Tsang
(74) Attorney, Agent, or Firm—McDermott, Will & Emery

(57) ABSTRACT

In a voice messaging system, voice mailboxes can be designated as private boxes from which boxes messages can be forwarded, with their source identities concealed, to destination mailboxes. Communication of messages may be between remote VMS systems as well as between mailboxes in the same VMS system. The private designation may be made selectively by a subscriber to the public switched telephone network on a global basis or on an individual basis for each message. The global designation may be toggled on or off at any time by a call to the system with appropriate input from the subscriber. Optionally, the private designation may be made for an individual message during the call in which the message is stored in the subscriber's mailbox. While information identifying the source of a communicated message is concealed from the recipient, a response message may be communicated from the recipient mailbox back to the source mailbox or a third party mailbox designated by the source subscriber.

25 Claims, 4 Drawing Sheets

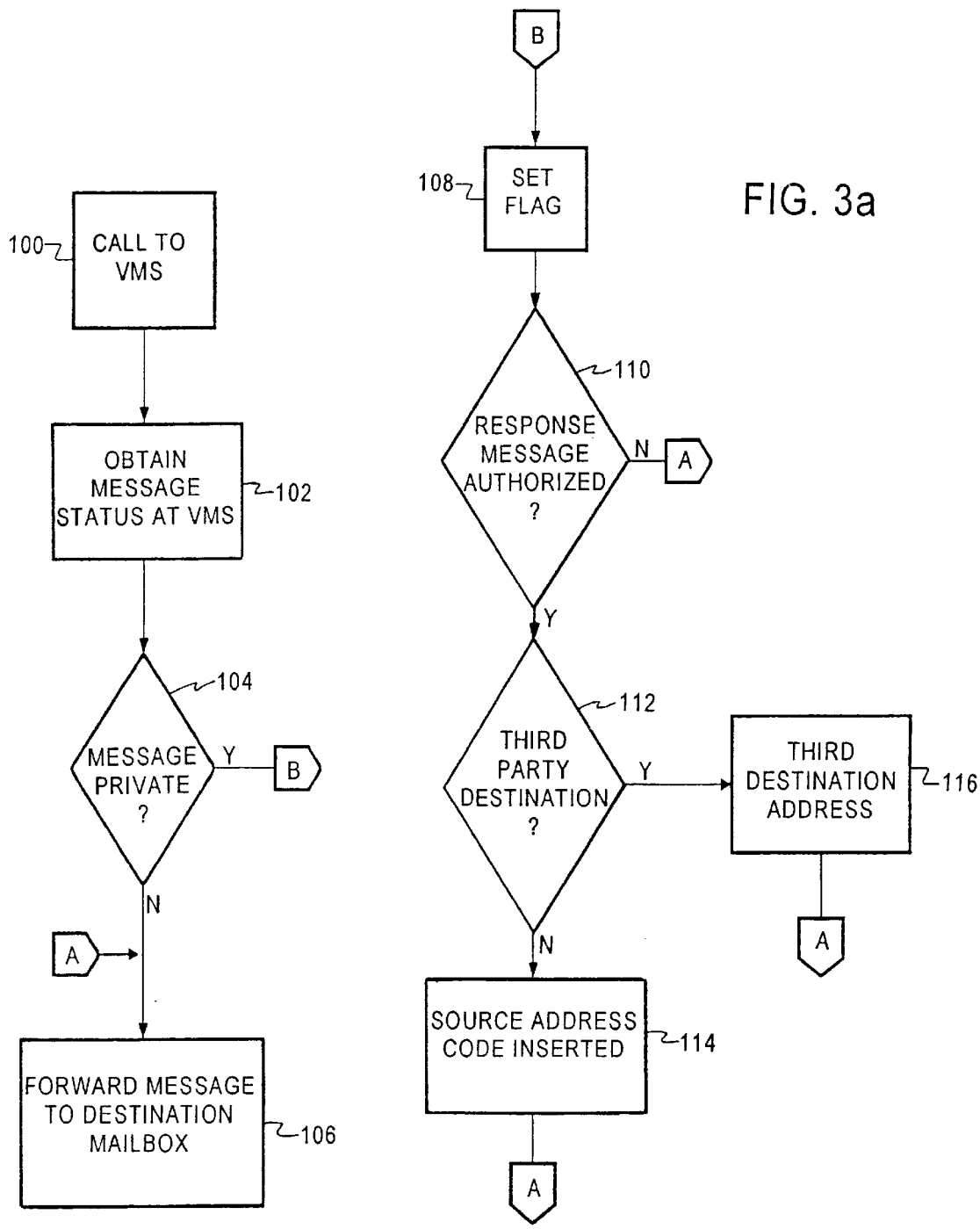

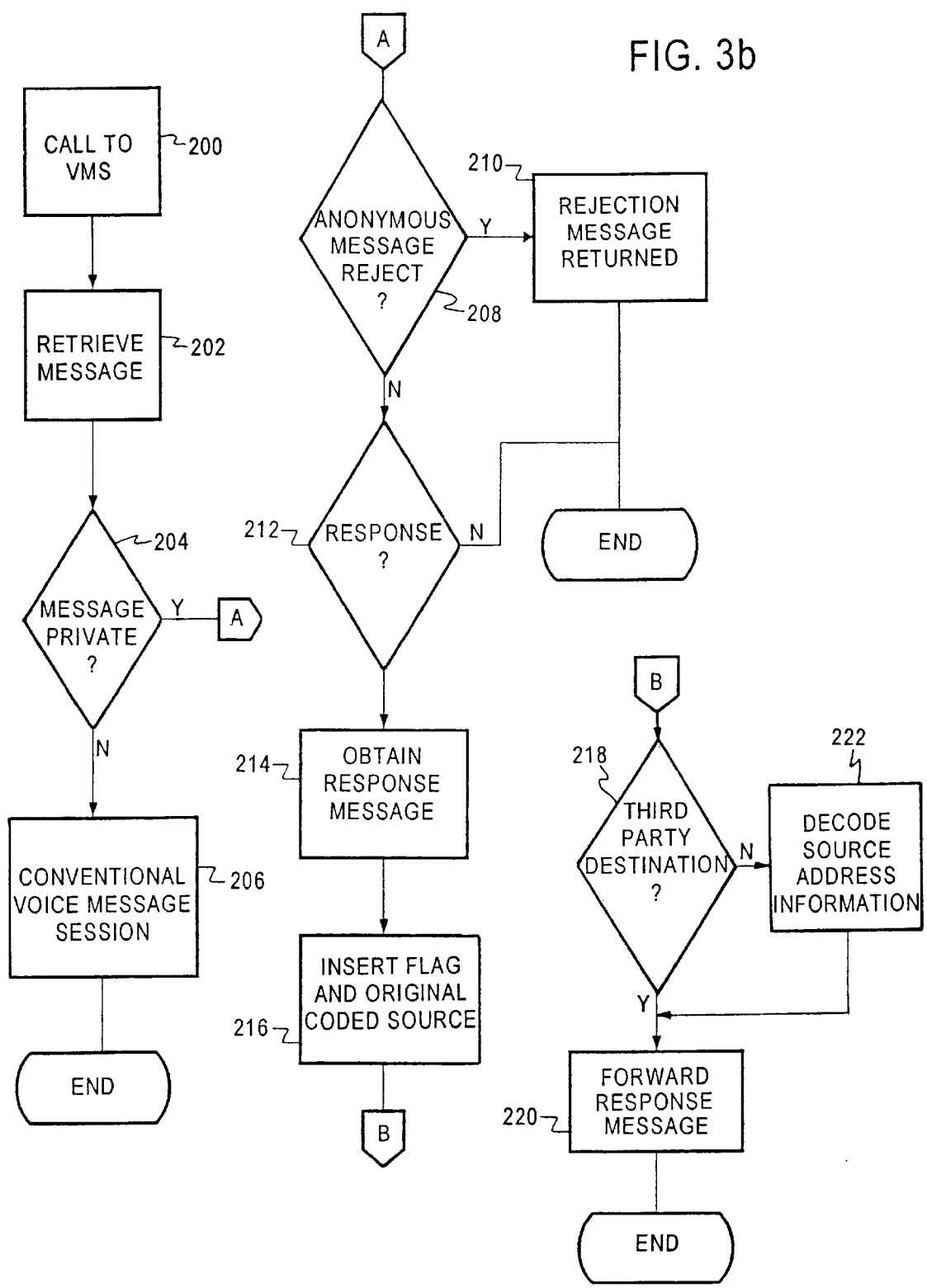

VOICE MAIL SOURCE ADDRESS INDENTIFICATION BLOCKING

TECHNICAL FIELD

The present invention relates to voice mail communication, more particularly to the ability to transfer voice mail messages among voice "mailboxes" without relaying address identification of a source mailbox.

BACKGROUND OF THE INVENTION

Caller ID has become a popular telephone service feature. Caller ID is a telephone on-hook capability that provides a called party with information about the caller before the incoming call is answered. Conventionally, such information includes the date and time of the call and the caller's telephone number. A data message, preceded by a channel seizure signal, is sent in conjunction with the ringing signal from the central office to the called party during the silent interval after the first 20-Hz, 2-second ringing phase. The service offers several advantages to the called party subscriber. Identification of the calling party, as provided by the caller ID service, allows the called party to screen an incoming call personally before its completion and thereby to decide whether or not it is desirable to answer the call. Nuisance calls, such as advertising and solicitation calls, can be avoided if the identity of the caller is determined beforehand. Knowledge of caller identity also serves as a resource for dealing with and curtailing harassment calls.

Despite its many favorable aspects of which the above noted advantages are but a few, caller ID has raised objections with respect to callers' rights of privacy. Such rights have conventionally been honored by "nonpublished" and "non-listed" options. A non-listed telephone number is not printed in a telephone directory but available through operator assistance. A nonpublished telephone number is neither printed in a directory nor available through an operator. If the caller number identity is made known to a called party caller ID subscriber each time a call is made, the privacy afforded to a caller having an on-listed or nonpublished number is significantly compromised. Further, any caller may find it desirable to place a particular call without revealing origination identity to the called party. In such case, the caller must take the risk that the called party line does not subscribe to the caller ID service.

To accommodate caller privacy, a caller ID block service has been developed, whereby the identity of the call originating line, which subscribes to caller ID block, will not be transmitted to the called party. Although variations exist in the precise manner in which caller ID information selectively may be withheld, ultimately the caller ID data message simply is not transmitted to the called party station. With caller ID blocked, a call is directed to the called party for completion in the standard manner and the caller ID functionality, to which the called party has subscribed, is lost.

Commonly assigned U.S. Pat. No. 5,497,414, issued to Bartholomew on Mar. 5, 1996 and to which reference is hereby made, offers several approaches in balancing the competing objectives of the calling party who wishes privacy and the called party who seeks to know the origination of incoming calls. These approaches make use of the Advanced Intelligent Network (AIN) of the Public Switched Telephone Network (PSTN), whereby call processing is enhanced by a decision making capability. Predefined criteria can be applied to calls by screening incoming caller identities to determine, for example, whether specific calls are to be completed to the called parties, with or without caller ID information, or to be forwarded to other destinations. With such control, both the called party caller ID subscriber and the calling party caller ID block subscriber are given flexibility. The calling party ID block subscriber may define in advance the destinations to which calling identification need not be blocked. The called party caller ID subscriber, likewise, may define the origination locations from which calls having blocked caller ID may be routed to the called party destination.

The provision of privacy is a more complex undertaking in the voice mail environment, wherein messages are communicated among voice mailboxes that require address identification. A voice mail system (VMS) is a specialized computer system that digitizes, compresses and stores audio and other messages in digital form on one or more disk drives. Voice mail identification is normally associated with the telephone number of the voice mail subscriber. As the ability to send return messages is a normal and expected attribute of voice mail communication, data message protocol provides for message headings to include both sending and receiving addresses. Thus, in conventional systems the receiving voice mailbox gains access to the source identity information. Nevertheless, there is a public need for privacy in certain circumstances. For one example, a response to an initial message sent by a "battered spouse" may be desired without the answering spouse being able to obtain the originating identification that can readily be linked to information sought to be kept private. Of course, there are many less dramatic and varied instances requiring privacy.

Audio Message Interchange Specification (AMIS) standards are being developed to form a common language that network voice mail systems of different manufacture can support to communicate in an effective manner. An objective is to support the exchange of electronic messages in any media among public messaging services and premises-based messaging systems. Accommodation thus would be made for premises-to-premises messaging, messaging between public mail services and private mail systems, and the exchange of messages between individual public mail services which otherwise operate in stand alone mode. Public message transfer service is defined in CCITT Recommendation F.410.

A simple form of networking voice mail is the use of guest mailboxes, in which boxes can be assigned to persons outside the system. Voice mail networking can also encompass terminating voice mail on one switch to which other switches are connected with networking software. Another alternative would be to network the voice mail systems themselves.

Commonly assigned U.S. Pat. No. 5,680,442, issued to Bartholomew et al. on Oct. 21, 1997 and incorporated by reference herein, contains a detailed description of a system that effects transfer of voice mail messages among centralized messaging systems, utilizing existing equipment and network facilities that are connected to subscriber terminals. To avoid voice connection to, and ringing at, a recipient's telephone station when only delivery of a message to the mailbox is to occur, the voice trunking network and ringing of the telephone station corresponding to the recipient mailbox are blocked. An additional benefit is a significant lightening of the traffic load on the network trunking system.

A remaining disadvantage of existing systems is that message source addresses are delivered to the recipient voice mail system. The sender of the voice mail message is subject to risk that the recipient will have access to the source address and thus the sender's telephone number. With such information, the recipient would be able to call the sender even if that telephone number were private. Further information, such as the sender's residence address, also would be subject to discovery. The need thus exists for the ability to transfer voice mail messages without relaying address identification of a source mailbox.

In furtherance of this objective, a need exists for providing the recipient of an "anonymous" message with the ability to send a return message even though the identifying information of the originating message had been withheld. For example, the sender of the original message may simply want to receive a response to the message without engaging in an interactive conversation. Such a requirement may be desirable, for example, to avoid a harassing telephone call while still obtaining requested information in a response message. As another example, service or product information may be requested from a vendor in an initial anonymous message. Such information can be obtained in the response message without the requesting party being subjected to a live interactive telephone call with an annoying, time consuming sales pitch.

SUMMARY OF THE INVENTION

The present invention overcomes the aforementioned problems. An advantage of the present invention is that voice mailboxes can be designated as private boxes from which boxes messages can be forwarded, with their source identities concealed, to destination mailboxes. This ability extends to communication of messages between remote VMS systems as well as communication between mailboxes in the same VMS system.

A further advantage of the invention is that a private designation may be made selectively by a subscriber to the public switched telephone network on a global basis, wherein all messages to be stored in the subscriber's mailbox will be treated as private, or on an individual basis for each message. The global designation may be selected at the time of subscription to the VMS service, as an automatic adjunct to a subscribed unpublished telephone number that is associated with the subscriber mailbox, or at any time after subscription to the VMS service. As an additional feature, the global designation may be toggled on or off at any time by a call to the system with appropriate input from the subscriber. For example, through DTMF key depression at the subscriber's telephone, a PIN and toggle selection can be entered. Optionally, the private designation may be made for an individual message during the call in which the message is stored in the subscriber's mailbox.

A further advantage of the private feature of the present invention is that information identifying the source of a communicated message is concealed from the recipient while permitting a response message to be communicated from the recipient mailbox back to the source mailbox. Source address data may be erased and set to all zero bits or replaced by a code identifying the session in which the message is sent between mailboxes. A flag may be set as an indicator that actual source address information has been deleted. The flag and session code may then be used by the VMS system of the originating message to identify delivery of the response message. The subscriber to the responding mailbox thus would not be informed of the original source mailbox identity and thus have no access to the associated telephone number. As an additional variation, the session code may identify a forwarding mailbox, in the same or remote VMS system, to which the response message is to be delivered.

Yet another advantage of the present invention is an anonymous message rejection option for a mailbox subscriber. With such option, the VMS system of the destination mailbox subscriber will automatically block receipt of a private message and send a reply message to the originating voice mailbox indicating the blocked receipt status of the original message.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout and wherein:

FIGS. 3a and 3b are flow charts illustrating operation in which various privacy features are provided in accordance with the invention.

DETAILED DESCRIPTION OF THE INVENTION

Figure 1:
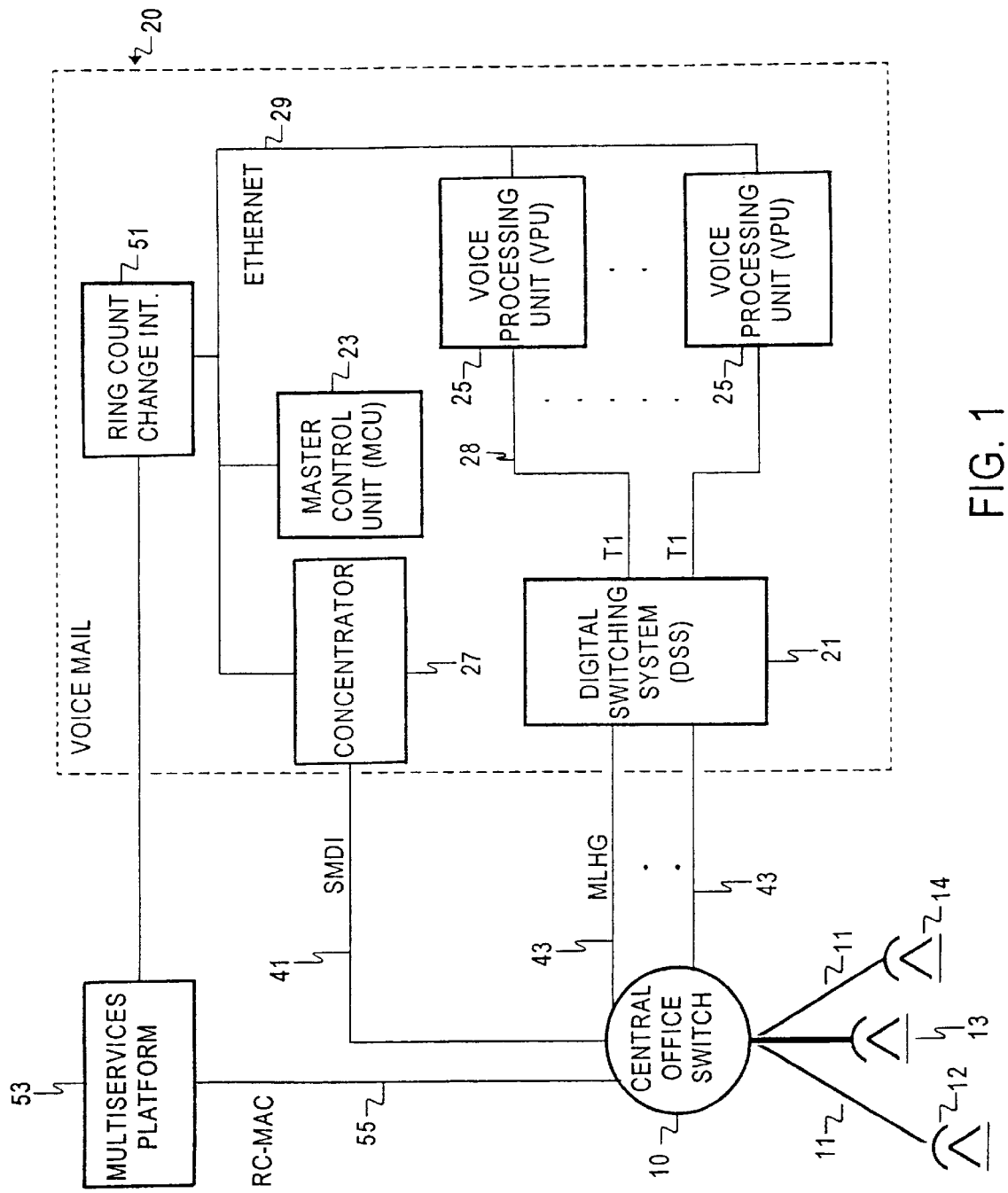
FIG. 1 is a simplified partial block diagram of a voice mail implementing communication system associated with one switching system of the public switched telephone network in which the invention may be practiced.

FIG. 1 is a simplified partial block diagram of a voice mail implementing communication system 20 associated with one switching system of the public switched telephone network in which the invention may be practiced. Telephone central office switch 10 may comprise any conventional switch, such as a 1AESS or 5ESS switch sold by Lucent Technologies, that typically includes, among other components, a space or time division switching matrix, a central processing unit, an input/output device and one or more data communication units. Each subscriber has at least one piece of customer premises equipment, illustrated as telephone station sets 12 through 14. Local telephone subscriber lines 11 serve as communication links between each of the telephone station sets 12 through 14 and the central office switching system 10. Although shown as telephones in the figure, the subscriber station equipment can comprise any communication device compatible with the line. Where the line is a standard voice grade telephone line, for example, the subscriber station equipment could include facsimile devices, modems etc.

The centralized message service or voice mail system in the illustrated example comprises voice messaging equipment such as a voice mail system 20. Although referred to as "voice" messaging equipment, equipment 20 may have the capability of storing messages of a variety of different types as well as voice messages. For example, a single system 20 may receive incoming messages in the form of audible messages, such as voice messages, as well as text format data messages. The voice messaging equipment 20 may also store messages in an image data format, such as facsimile. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The illustrated voice mail system 20 includes a digital switching system (DSS) 21, a master control unit (MCU) 23, a number of voice processing units (VPU's) 25 and a master interface unit (MIU) or concentrator 27. The master control unit (MCU) 23 is a personal computer type device programmed to control overall operations of the system 20. Each of the voice processing units 25 also is a personal computer type device. The voice processing units 25 each may include or connect to one or more digital mass storage type memory units (not shown) in which the actual messages are stored. The mass storage units, for example, may comprise magnetic disc type memory devices. Although not specifically illustrated in the drawing, the voice processing units 25 also include appropriate circuitry to transmit and receive audio signals via T1 type digital audio lines. To adapt the system 20 to receive information other than voice and/or offer services other than voice mail, one or more of VPU's 25 might be reprogrammed to run other types of applications and/or process other types of incoming information. For example, one such unit might process facsimile information, one might process E-mail, etc.

An ETHERNET type digital network 29 carries data signals between the MCU 23 and the voice processing units 25. The Ethernet network 29 also carries stored messages, in digital data form, between the various voice processing units 25. The system 20 further includes T1 type digitized audio links between the DSS switch 21 and each of the voice processing units 25.

The voice mail system 20 is connected to the central office switching system 10 via a number of simplified message desk interface (SMDI) type data lines 41, only one of which is illustrated for simplicity. These SMDI links connect between one or more data units (not shown) in the end office switching system 10 and the MIU 27 in system 20. Each SMDI line may carry 2400 baud RS-232 data signals or higher in both directions between the voice mail system 20 and the switching system 10. The MIU 27 is a data concentrator which effectively provides a single connection of as many as thirty two SMDI lines into the MCU 23 of the voice mail system.

The voice mail system 20 also connects to the end office switching system 10 via a number of voice lines 43 which form a multi-line hunt group (MLHG) between the switch matrix within the switching system 10 and the DSS switch 21 of the voice mail system 20. Typically, the MLHG lines 43 consist of a number of T1 type trunk circuits which each carry twenty four voice channels in digital time division multiplexed format.

Ring count change interface 51, connected to the Ethernet network 29, provides two-way data communication between the network 29 in the voice mail system 20 and a multiservices platform (MSP) 53. For example, the unit 51 might provide a 9600 baud data channel over a line to the platform 53. The interface 51 will receive packets of data over the Ethernet network 29 indicating changes in the status of the various subscribers' mailboxes. These packets of data will identify a particular subscriber and indicate the number a number of rings for future use in processing calls for that subscriber. The interface 51 forwards the ring count change data packets to the platform 53. The interface also receives data signals from the MSP 53, for example acknowledgements of transmitted data and/or signals indicating actual changes of status information by the switching system 10. In enhanced embodiments, the interface might include some data processing capabilities, as well. Also, the interface can provide instructions to change some other parameter of the call forwarding procedure, such as the subscriber's forwarding number.

The multiservices platform 53 is connected to the central office switching system 10 via a recent change-memory administration channel (RC-MAC) 55. RC-MAC 55 is a data link to the processor of the switching system 10 for inputting data into the translation tables used by the switching system 10 to control switched communications operations with regard to each subscriber's line. The multiservices platform is a processor for receiving various service change instructions, including those from the interface 51 and from other sources, processing the instructions as necessary to make them compatible with switch programming, and forwarding instructions to the switching system 10 to change specific relevant translation table data stored in the switching system. In response to the change of status data from the ring count interface 51, the multiservices platform 53 provides appropriate data packet signals on the RC-MAC channel 55 to the end office switching system 10 to change a particular subscriber's ring count for forwarding on no answer. The instructions from the MSP 53 will identify a specific subscriber's line and will specify a ring count or ringing interval for use in determining when a call for that subscriber has gone unanswered and should be forwarded to the voice mail system 20. The multiservices platform may also forward instructions to change other parameters of the call forwarding function. Reference is made to commonly assigned U.S. Pat. No. 5,012,511 to Hanle et al., for a more detailed description of operation via an RC-MAC channel.

In operation, calls can be forwarded to the voice mail system 20 in response to calls to subscriber's lines. The switching system 10 may also route some calls directly to the voice mail system 20 in response to callers dialing a telephone number assigned to the lines going to the voice mail system 20. When the end office switching system 10 directs a call to the voice mail system 20, whether as a forwarded call or as a direct call in response to dialing of a number for accessing the system 20, the switching system places the call on any available channel on the multi-line hunt group lines 43. When the central office switching system 10 forwards a call to the voice mail system 20, the switching system 10 will also provide various data relating to the call via one of the SMDI links 41 and the MIU 27. In particular, the switching system 110 transmits data to the MCU 23 of the voice mail system 20 indicating which line of the multi-line hunt group 143, i.e. which T1 trunk and which channel on the trunk, that the new call will come in on. The exchange 10 also transmits data via SMDI link 41 identifying the called telephone number and the telephone number of the caller. For a call forwarded to a mailbox, the data from the exchange indicates the reason for the forwarding, and the caller telephone number (typically the directory number assigned to the called subscriber's normal telephone line) identifies the subscriber to which the forwarded call relates. The master control unit 23 uses the multi-line hunt group line information and the subscriber's directory number to internally route the forwarded call though DSS switch 21 and one of the internal T1 links to an available voice processing unit 25 and identifies the relevant subscriber to that voice processing unit via the Ethernet 25.

For each party who subscribes to a voice mail service provided by the centralized messaging system 20, the MCU 23 stores information designating one of the voice processing units 25 as the "home" unit for that subscriber. Each voice processing unit 25 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit. In voice mail systems of the type discussed above, a subscriber's "mailbox" does not actually correspond to a particular area of memory. Instead, the messages are stored in each "mailbox" by storing appropriate identification or tag data to identify the subscriber or subscriber's mailbox to which each message corresponds.

Each time a call comes in to the voice mail system 20, the master control unit 23 controls the digital switching system 21 to provide a multiplexed voice channel connection through to one of the voice processing units 25. Typically, the call connection goes to the "home" voice processing unit for the relevant subscriber. The voice mail subscriber is identified by data transmitted from the switching system 10, as described above, if the call is a forwarded call. If all twenty four T1 channels to the "home" voice processing unit are engaged, the central processing unit 23 controls switch 21 to route the call to another voice processing unit 25 which is currently available. The voice processing unit connected to the call retrieves prompt messages and/or previously stored messages from its memory and transmits them back to the calling party via the internal T1 line 28, the DSS switch 21 one of the MLHG lines 43, central office switching system 10 and the calling party's telephone line. The voice processing unit 25 connected to the call receives incoming messages from the caller through a similar route and stores those messages in digital form in its associated mass storage device. When the incoming call is a forwarded call, the connected voice processing unit 25 provides an answering prompt message to the caller, typically including a personalized message recorded by the called subscriber. After the prompt, the voice processing unit 25 records a message from the caller and identifies that stored message as one for the called subscriber's mailbox.

At times the connected voice processing unit 25 will not have all necessary outgoing messages stored within its own associated memory. For example, a forwarded call normally will be connected to the called subscriber's "home" voice processing unit 25, but if the home unit is not available the forwarded call will be connected to a voice processing unit 25 other than the subscriber's home voice processing unit. In such a case, the connected unit 25 requests and receives from the home unit 25 the personalized components of the answering prompt message via the data network 29. The connected voice processing unit 25 will store the transferred message data in its own memory, and when necessary, will play back the transferred data from its own memory as outgoing messages in the exact same manner as for any prompts or greeting messages originally stored in its own memory.

The connected voice processing unit 25 also will store any incoming message in its own associated memory together with data identifying the message as one stored for the called subscriber's mailbox. As a result, the system 20 actually may store a number of messages for any given subscriber or mailbox in several different voice processing units 25. Subsequently, when the voice mail subscriber calls in to the voice mail system 20 to access the subscriber's mailbox, the call is connected to one voice processing unit 25. Again, this call typically goes to the home unit 25 but would go to a different available one of the units 25 if the home unit is not available at the time. In response to appropriate DTMF control signals received from the subscriber, the connected voice processing unit retrieves the subscriber's messages from its own memory and plays the messages back to the subscriber. If any messages are stored in other voice processing units, the connected unit 25 sends a request the other units 25 to download any messages for the subscriber's mailbox those units have actually stored. The downloaded messages are stored in the memory of the connected voice processing unit 25 which replays them to the subscriber.

Figure 2:
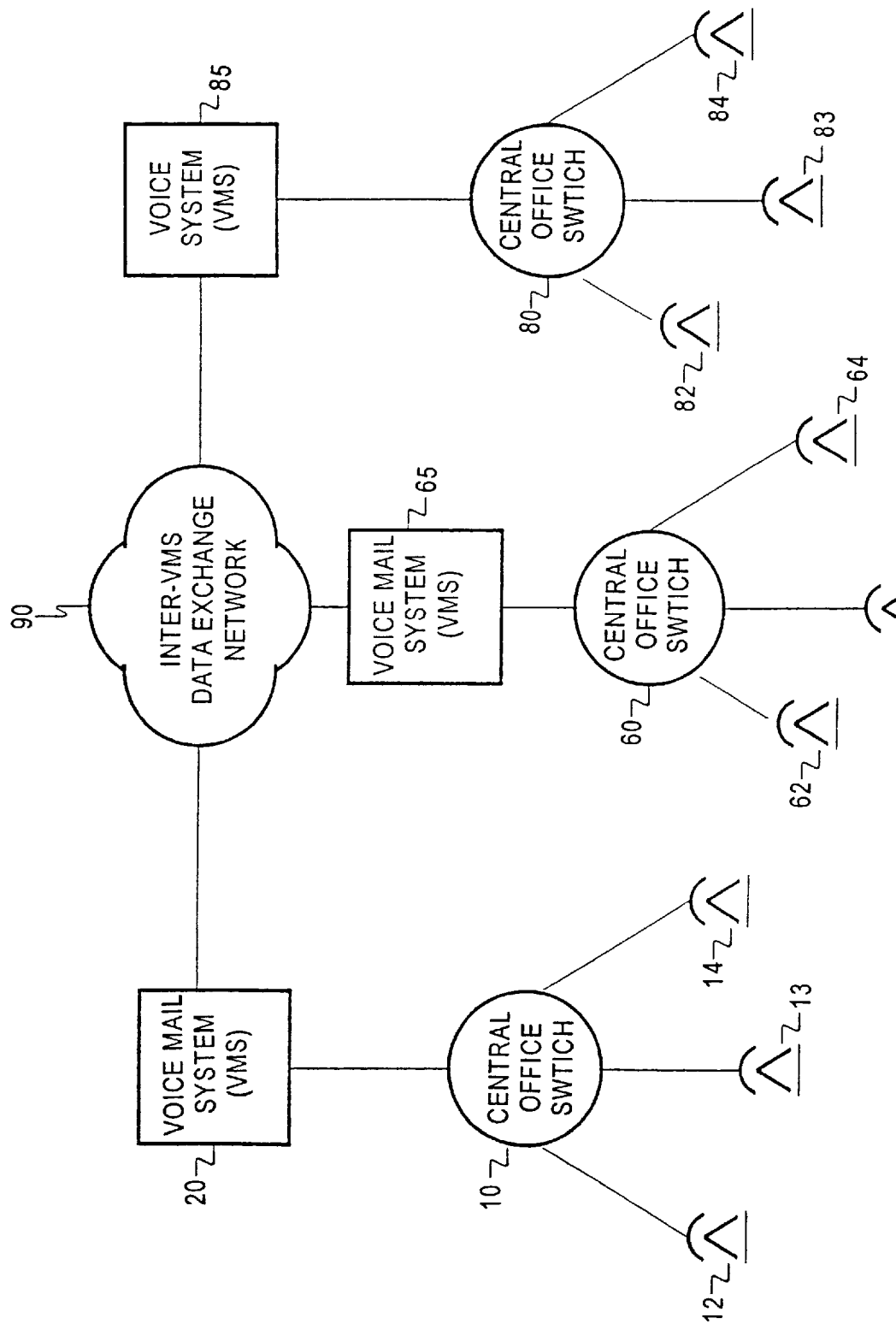
FIG. 2 is a simplified partial block diagram in accordance with the present invention in which voice mail communication may occur among a plurality of voice mail systems at remote locations in the public switched telephone network.

FIG. 2 is a simplified illustration of a network in which a plurality of remote voice mail systems serve subscribers of respective central office switches of the public switched telephone network. Central office switches 10, 60 and 80 are representative of a large plurality of such switches in a network such as the AIN network. For simplicity of illustration, a great many of the network details, which are not necessary for explanation of the present invention, have not been shown in the drawing figure. Reference is again made to commonly assigned U.S. Pat. No. 5,680,442 for a more detailed description of the AIN network. Subscribers 12 through 14 have local line connections to central office switch 10 and are assumed to have voice mail service provided by the associated VMS 20. Similarly, subscribers 62 through 64 are served by VMS 65 via their central office switch 60 and subscribers 82 through 84 are served by VMS 85 via their central office switch 80. VMS systems 20, 65 and 85 are linked by a data exchange network 90 for exchange of voice mail messages among the VMS systems. Data network 90 may comprise a high speed data network, for example an FDDI link, or may be incorporated into the common channel signaling network of the PSTN as disclosed in the aforementioned U.S. Pat. No. 5,680,442. In operation, each of the VMS systems comprises mailbox storage allocations for the associated central office subscribers for functional interaction as described above with respect to FIG. 1. The transfer of stored messages is not limited to mailboxes within an individual VMS system but may occur between mailboxes in remote VMS systems. Thus, for example, subscriber 12 may have a message delivered from his mailbox in VMS 20 not only to the mailbox corresponding to subscriber 14 in the same VMS 20, but also to the mailbox in VMS 85 that is assigned to subscriber 84.

FIGS. 3a and 3b are flow charts illustrating operation in which various privacy features are provided in accordance with the invention. The flow chart of FIG. 3a depicts interaction between the sender of a message and the VMS system or systems for delivery of an initial message. It is assumed, for example, that subscriber 12 seeks to transfer a voice mail message to a specified recipient's mailbox. The message may be formulated by the subscriber at the session in which transfer is requested or may have been previously stored in the mailbox of subscriber 12. At step 100, subscriber 12 initiates a call to the VMS 20 via central office switch 10. At step 102, an interactive session takes place between subscriber 12 and VMS 20, wherein information is obtained as to message privacy and availability for receipt of a response message at the private mailbox or designation of a third party mailbox destination for a response message. During this session, for example, the global privacy status of the mailbox may be toggled on or off, or private/nonprivate status of only the current message can be set. This information may be obtained through a voice response mechanism or through DTMF input. The message is stored in digital format with appropriate header identification information at the mailbox corresponding to subscriber 12. If the message is not private, as determined in step 104, the message is forwarded to the destination mailbox in step 106. If the recipient destination is a mailbox within VMS 20, such as the mailbox for subscriber 14, data exchange network 90 is not required for transfer to a remote VMS. If the recipient destination is a remote mailbox, such as one in VMS 85 that corresponds to subscriber 84, the message is transmitted over a data network such as data exchange network 90 of the common channel signaling network of the PSTN.

If the message has been designated private, as determined in step 104, a flag will be set to indicate that identification of the source mailbox of the message is not to be included in the message heard by the retrieving party. The flag will be related to the current message session in which the source mailbox identification and other necessary session information is stored separately in the sending VMS storage facility. Additional flag related information may be required in dependence upon whether a response message was authorized as determined in step 110. If no response has been authorized, the message is then forwarded to the destination mailbox as in step 106. The recipient will thus have access to the spoken content of the message but will not be able to identify the source location nor send a return message. The sender thus can avoid any unwanted, possibly harassing or annoying, communication from the recipient.

If it is determined in step 110 that a response message has been authorized, a further determination is made in step 112 as to whether the response message is to be delivered to the source of the initial message, i.e., mailbox of subscriber 12, or a third party mailbox. With such options, the sender can avoid direct return communication from the recipient by diverting a return message through a third party in the latter option. In the former option, the sender can obtain a needed voice response without being subject to a harassing or annoying interactive phone call. It may be assumed that the actual voice message content will also inform the message recipient of the intended response message forwarded destination.

If it is determined in step 112 that a response message is to be returned to subscriber 12's mailbox, in step 114 a code related to the flag and stored session information will be inserted in place of what would normally be the source address portion of the message. If instead it is determined in step 112 that the response message is to be delivered to a third party mailbox, such as that of subscriber 64 in VMS 65, the address of that location is inserted in the source address portion of the original message at step 116. The message is then forwarded to the destination mailbox in step 106.

The code inserted in the source address portion of the message can be used as a reference in a received response address by the VMS 20 to access the session information in its separate storage facility to translate the destination of the response message to the subscriber 12 mailbox address. If the recipient of the original message is a mailbox in a remote VMS, such as the mailbox for subscriber 84, a high measure of security is provided as the VMS 85 does not receive identification of the source of the message.

The flow chart of FIG. 3b illustrates a voice mail session in which a message, such as the one forwarded in the operation of FIG. 3a, is retrieved from a recipient's mailbox. At step 200, the recipient accesses the subscribed mailbox. As in the example of FIG. 3a, the recipient mailbox may be that of subscriber 14 in VMS 20 or of subscriber 84 in VMS 85. The recipient VMS then checks for a flag in the message in step 204 to determine whether the message is private. If not, the voice message session may take any conventional course in step 206 until completed. If it is determined in step 204 that the message is private, then at step 208 determination is made as to whether the recipient has subscribed to an anonymous message rejection option. If so, in step 210 a rejection message notifying of the non-delivery of the message is returned to the mailbox of subscriber 12, either directly if the recipient mailbox is served by the original sender's VMS 20, or through the translation by the VMS 20 of the code inserted in the return message by the remote VMS 85. Optionally, a rejection message may be placed in the recipient mailbox that informs of a rejected attempt to deliver thereto an anonymous message.

If the anonymous message has not been rejected, as determined in step 208, the message is played to the recipient subscriber who then may have an option to send a response message unless unauthorized by the original sender. If no response message occurs, as determined in step 212, the session ends. If it is determined in step 212 that a response message is to be forwarded, the subscriber formulates the message at step 214. The message is digitized by the recipient's VMS at step 216 with the flag included and coded source information inserted as destination address. The coded source information may be either the session code or the third party address as it appears in the original message. The response message may be stored temporarily at the mailbox of the recipient for future delivery or delivered immediately, depending on various conditions in the VMS system. If the VMS system of the responder is remote from the destination VMS, the time of transmission may depend upon data network conditions.

In preparation of delivery of the response message, at step 218 the responding VMS determines from coded source address and flag if the destination is a third party mailbox. The coded information sufficient to identify the destination VMS and either the third party address or the code to be translated to the original sender's address. If a third party address is determined in step 218, at step 220 the response message is delivered to the destination mailbox. If this mailbox is in the same VMS the response message is forwarded directly. If appropriate the third party mailbox is in a remote VMS system, the message is forwarded through the data exchange network 90. If the response message is to be delivered to the original message source, as determined in step 218, the original VMS, whether the same as or remote from the response VMS, will decode the source address information of the response message in accordance with its stored session data to identify the destination of the response message and forward the response message to the appropriate mailbox.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, variations in privacy and rejection options can be offered to mailbox subscribers without departing from the concepts of this invention.

What is claimed is:

1. In a voice mail system having addressable storage for storing digital format voice mail messages in mailboxes associated with respective telephone numbers of a plurality of served subscribers that are connectable to the voice mail system through respective local loops of the Public Switched Telephone Network (PSTN) and at least one telephone central switching office, the digital voice mail messages comprising header identification and voice information content, a method for communicating voice mail messages between the voice mailboxes comprising the steps of:

designating at least one of the voice mailboxes as a private voice mailbox;

storing a voice mail message received by the voice mail system from a first subscriber in the first subscriber's associated voice mailbox;

in response to a request from the first subscriber to transfer the voice mail message stored in the storing step to an identified second subscriber voice mailbox, determining whether the first subscriber voice mailbox is designated private;

in response to a private designation determination in said determining step, concealing the identification of the first subscriber voice mailbox in the header portion of the message; and forwarding the message, with the identification of the first subscriber voice mailbox concealed, to the second subscriber voice mailbox.

2. A method as recited in claim 1, wherein the step of designating comprises establishing a global privacy status for all messages to be stored in the private box.

3. A method as recited in claim 2, wherein the establishing step is initiated upon subscription by the subscriber to the voice mail system.

4. A method as recited in claim 2, wherein the designating step further comprises setting the privacy status in response to a privacy indicator set in the PSTN for the subscriber telephone number associated with the private box.

5. A method as recited in claim 2, wherein the establishing step comprises the steps of:

receiving a call that requests privacy status from a calling subscriber; and toggling the global status of the mailbox associated with the calling subscriber from non-private to private.

6. A method as recited in claim 5, further comprising the steps of:

receiving a call that requests a change of privacy status from the calling subscriber; and toggling the status of the mailbox associated with the calling subscriber from private to non-private.

7. A method as recited in claim 1, wherein the step of designating comprises selectively setting a privacy status for each message stored in the designated voice mailbox.

8. A method as recited in claim 7, wherein the step of selectively setting occurs during a calls from the subscriber of the designated voice mailbox to the voice mail system, in which a message is formulated.

9. A method as recited in claim 1, wherein the concealing step comprises erasing source identifying data from the header portion of the message and the forwarding step comprises setting a flag in the message.

10. A method as recited in 9, wherein the concealing step further comprises replacing the erased source identifying data with coded data related to the flag.

11. A method as recited in claim 9, further comprising the steps of:

forming a response message to be sent from the second subscriber voice mailbox to a receiving voice mailbox in response to input received from a user of the second subscriber mailbox;

entering data related to the flag in the response message;

identifying a voice mailbox for receiving the response message from the data entered in the entering step;

and delivering the response message to the receiving voice mailbox identified in the identifying step.

12. A method as recited in claim 11, wherein the flag related data of the entering step is entered as a destination address in the header portion of the response message.

13. A method as recited in claim 11, wherein the receiving voice mailbox is the first subscriber voice mailbox.

14. A method as recited in claim 11, wherein the receiving voice mailbox is a mailbox other than the first subscriber voice mailbox.

15. A method as recited in claim 14, wherein the receiving voice mailbox is stored at a location remote from the voice mail system and interconnected thereto via the public switched telephone network.

16. A method as recited in claim 1, further comprising the step of selectively tagging, in response to input from the first subscriber, the voice mail message for blocking receipt of reply messages.

17. A method as recited in claim 1, further comprising the steps of:

determining whether the second subscriber voice mailbox has been designated for rejecting anonymous voice mail messages; and blocking receipt of the voice mail message at the second subscriber mailbox in response an anonymous message rejection determination if a private designation determination was made in said determining step.

18. A method as recited in claim 17, wherein the blocking step further comprises sending a reply message to the first subscriber voice mailbox indicating the blocked receipt status of the original voice mail message.

19. In a switched communication network including first and second interconnected central office switching systems each connected to a plurality of subscriber lines to which subscriber communication equipment may be coupled, each of the first and second central office switching systems coupled to an associated centralized voice messaging system having addressable storage associated respectively with voice mailboxes of the subscriber lines, a method for communicating voice messages between the centralized voice messaging systems comprising:

designating at least one of the voice mailboxes of a first one of the centralized voice messaging systems as a private box;

storing a voice mail message directed to a destination voice mailbox of a second one of the centralized voice messaging systems in a source voice mailbox of the first centralized voice messaging system;

determining whether the source voice mailbox is designated private;

in response to a private determination in the determining step, concealing the identification of the first subscriber voice mailbox in a data portion of the message; and forwarding the message, with the identification of the first subscriber mailbox concealed, to the destination voice mailbox in the second centralized voice messaging system.

20. A method as recited in claim 19, wherein the forwarding step comprises the steps of:

forming session identifying data for transmission of the message;

formatting the message in one or more packets having data header portions and message content portions in accordance with a data network protocol; and transmitting the message to the second centralized voice messaging system;

and the concealing step comprises erasing source mailbox address data from the data header portions.

21. A method as recited in claim 20, wherein the concealing step further comprises the steps of:

replacing the erased source mailbox address data with session code data; and setting a flag in the data header portions.

22. A method as recited in claim 21, further comprising the steps of:

formulating a response message at the second centralized voice messaging system to be sent to a receiving mailbox;

entering session code data in a destination address portion of the response message;

transmitting the response message to the first centralized voice messaging system;

identifying, at the first centralized voice messaging system, the receiving mailbox for the response message in accordance with the data entered in the entering step;

and delivering the response message to the receiving mailbox identified in the identifying step.

23. A method as recited in claim 22, wherein the receiving mailbox is the source voice mailbox of the first centralized voice messaging system.

24. A method as recited in claim 22, wherein the receiving mailbox is a mailbox other than the source voice mailbox.

25. A method as recited in claim 24, wherein the receiving mailbox is located remote from the first centralized voice messaging system.

* * * * *